(12) United States Patent
Einav et al.

(10) Patent No.: US 12,517,677 B2
(45) Date of Patent: Jan. 6, 2026

(54) OPTIMIZED XOR LOADING TO SRAM AND HMB

(71) Applicant: Sandisk Technologies, Inc., Milpitas, CA (US)

(72) Inventors: Daphna Einav, Salit (IL); Lior Bublil, Petah Tikva (IL); Eran Moshe, Kfar Saba (IL)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/584,081

(22) Filed: Feb. 22, 2024

(65) Prior Publication Data

US 2025/0272022 A1   Aug. 28, 2025

(51) Int. Cl.
*G06F 3/06* (2006.01)

(52) U.S. Cl.
CPC .......... *G06F 3/0656* (2013.01); *G06F 3/0604* (2013.01); *G06F 3/0679* (2013.01)

(58) Field of Classification Search
CPC ..... G06F 3/0656; G06F 3/0604; G06F 3/0679
USPC ....................................................... 711/154
See application file for complete search history.

(56) References Cited

U.S. PATENT DOCUMENTS

| | | | |
|---|---|---|---|
| 10,055,236 B2 | 8/2018 | Erez et al. | |
| 10,613,943 B2 | 4/2020 | Guo et al. | |
| 10,872,012 B2 | 12/2020 | Subramanian et al. | |
| 11,138,071 B1* | 10/2021 | Agarwal | G06F 3/061 |
| 11,188,250 B2 | 11/2021 | Springberg et al. | |
| 2020/0133563 A1* | 4/2020 | Springberg | G06F 3/0656 |
| 2020/0218605 A1 | 7/2020 | Subramanian et al. | |
| 2020/0264805 A1 | 8/2020 | Yoshii et al. | |
| 2021/0303394 A1 | 9/2021 | Singidi et al. | |
| 2021/0374003 A1 | 12/2021 | Helmick et al. | |
| 2023/0112636 A1* | 4/2023 | Doni | G06F 3/064 711/103 |
| 2023/0195357 A1* | 6/2023 | Sharma | G06F 11/1012 |
| 2023/0214291 A1* | 7/2023 | Muthiah | G06F 3/0619 714/764 |
| 2023/0273745 A1* | 8/2023 | Kulkarni | G06F 11/10 711/154 |

FOREIGN PATENT DOCUMENTS

CN   115562569 A   1/2023

OTHER PUBLICATIONS

International Search Report and Written Opinion dated Apr. 30, 2025 for Application No. PCT/US2025/010841.

* cited by examiner

*Primary Examiner* — Than Nguyen
(74) *Attorney, Agent, or Firm* — Patterson + Sheridan, LLP

(57) ABSTRACT

Selectively writing relevant bins directly to a controller's volatile memory (e.g., SRAM) based on a next-to-write address and writing the remaining bins to a host's volatile memory (e.g., DRAM or HMB), avoids the need for any additional reads from host's volatile memory and writes from controller's volatile memory. Avoiding the need for any additional reads from host's volatile memory, which has a slower access time than controller's volatile memory, improves exit latency from the boot and low-power-state exit flows. Prior to writing the parity bins to the controller or the host, the controller may store parity bins and/or the next-to-write address in non-volatile memory. The next-to-write address is then evaluated to determine whether a party bin is written to the controller's volatile memory or the host's volatile memory.

20 Claims, 10 Drawing Sheets

300

| WL 302 | STRING 304 | PAGE 306 |
|---|---|---|
| 0 | 0 | 0 |
|   | 1 | 1 |
|   | 2 | 2 |
|   | 3 | 3 |
|   | 4 | 4 |
| 1 | 0 | 5 |
|   | 1 | 6 |
|   | 2 | 7 |
|   | 3 | 8 |
|   | 4 | 9 |
| 2 | 0 | 10 |
| ... | ... | ... |
| 160 | 0 | 800 |
|   | 1 | 801 |
|   | 2 | 802 |
|   | 3 | 803 |
|   | 4 | 804 |
| 161 | 0 | 805 |
|   | 1 | 806 |
|   | 2 | 807 |
|   | 3 | 808 |
|   | 4 | 809 |

| | Die0 602 | | | | Die1 604 | | | | Die2 606 | | | | Die3 608 | | | |
|---|---|---|---|---|---|---|---|---|---|---|---|---|---|---|---|---|
| | PL0 | PL1 | PL2 | PL3 | PL0 | PL1 | PL2 | PL3 | PL0 | PL1 | PL2 | PL3 | PL0 | PL1 | PL2 | PL3 |
| | 0 | 1 | 2 | 3 | 4 | 5 | 6 | 7 | 8 | 9 | PAD | PAD | 0 | 1 | 2 | 3 |
| | 4 | 5 | 6 | 7 | 8 | 9 | PAD | PAD | 0 | 1 | 2 | 3 | 4 | 5 | 6 | 7 |
| | 8 | 9 | PAD | PAD | 0 | 1 | 2 | 3 | 4 | 5 | 6 | 7 | 9 | PAD | PAD | PAD |

FIRST PARITY 610

SECONDARY PARITY 620

THIRD PARITY 630

FOURTH PARITY 640

OPTIMIZED XOR LOADING TO SRAM AND HMB

BACKGROUND OF THE DISCLOSURE

Field of the Disclosure

Embodiments of the present disclosure generally relate to improving parity bin storage.

Description of the Related Art

Most storage devices implement schemes, such as XOR, to protect data stored on non-volatile memory (e.g., NAND flash memory). In a XOR scheme, data from the wordlines (WLs) is subjected to an XOR operation to generate XOR parity. The XOR parity generated by accumulating results of the XOR operation between the current WL and one or more other WLs is stored in a parity bin. If the data in any WL is lost (e.g., due a physical defect or otherwise), then the XOR parity is used to recover the data stored on that WL.

Currently, during a graceful shutdown (GSD), the bin parities are stored on the NAND in a special XOR block for all the open blocks (i.e., for blocks which are not full yet. During the current boot flow and exit from low-power-state flow, the parity bins are loaded from the NAND to a host memory buffer (HMB) and then the relevant bins are read from the HMB and written to static random access memory (SRAM). As the HMB is external to the device, the access time for the device controller to read and write is slow.

There is a need in the art for improved XOR loading to a data storage device.

SUMMARY OF THE DISCLOSURE

Selectively writing relevant bins directly to a controller's volatile memory (e.g., SRAM) based on a next-to-write address and writing the remaining bins to a host's volatile memory (e.g., DRAM or HMB), avoids the need for any additional reads from host's volatile memory and writes from controller's volatile memory. Avoiding the need for any additional reads from host's volatile memory, which has a slower access time than controller's volatile memory, improves exit latency from the boot and low-power-state exit flows. Prior to writing the parity bins to the controller or the host, the controller may store parity bins and/or the next-to-write address in non-volatile memory. The next-to-write address is then evaluated to determine whether a party bin is written to the controller's volatile memory or the host's volatile memory.

In one embodiment, a data storage device comprises: a memory device; and a controller coupled to the memory device, wherein the controller is configured to: store a plurality of parity bins in non-volatile memory; select at least one parity bin from the plurality of parity bins to write to a first volatile memory; write the at least one parity bin to the first volatile memory; and write the remaining parity bins of the plurality of parity bins to a second volatile memory.

In another embodiment, a data storage device comprise: a memory device; and a controller coupled to the memory device, wherein the controller is configured to: determine an address of an open block in a first volatile memory, wherein the address of the open block in the first volatile memory is a next address in the first volatile memory where a next data will be written; store the address of the open block in non-volatile memory; select at least one first parity bin to write to the first volatile memory; write the at least one first parity bin to the open block in the first volatile memory; and write at least one second parity bin to a second volatile memory.

In another embodiment, a data storage device comprises: means to store data; and a controller coupled to the means to store data, wherein the controller is configured to: store a plurality of parity bins in non-volatile memory in response to a pre-determined event; determine an address of an open block in a first volatile memory, wherein the address of the open block in the first volatile memory is a next address in the first volatile memory where a next data will be written; store the address of the open block in the first volatile memory; select at least one parity bin from the plurality of parity bins to write to a first volatile memory during a boot exit flow or a low-power-state exit flow; write the at least one parity bin to the first volatile memory; and write the remaining parity bins of the plurality of parity bins to a second volatile memory.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 3 is a schematic diagram illustrating a flash memory physical block, according to another embodiment.

FIG. 5 is a schematic block diagram illustrating a XOR scheme for a single-level cell (SLC) umbo block, according to another embodiment.

FIG. 6 is a schematic block diagram illustrating a XOR block in volatile memory, according to another embodiment.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments.

Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Selectively writing relevant bins directly to a controller's volatile memory (e.g., SRAM) based on a next-to-write address and writing the remaining bins to a host's volatile memory (e.g., DRAM or HMB), avoids the need for any additional reads from host's volatile memory and writes from controller's volatile memory. Avoiding the need for any additional reads from host's volatile memory, which has a slower access time than controller's volatile memory, improves exit latency from the boot and low-power-state exit flows. Prior to writing the parity bins to the controller or the host, the controller may store parity bins and/or the next-to-write address in non-volatile memory. The next-to-write address is then evaluated to determine whether a party bin is written to the controller's volatile memory or the host's volatile memory.

Figure 1:
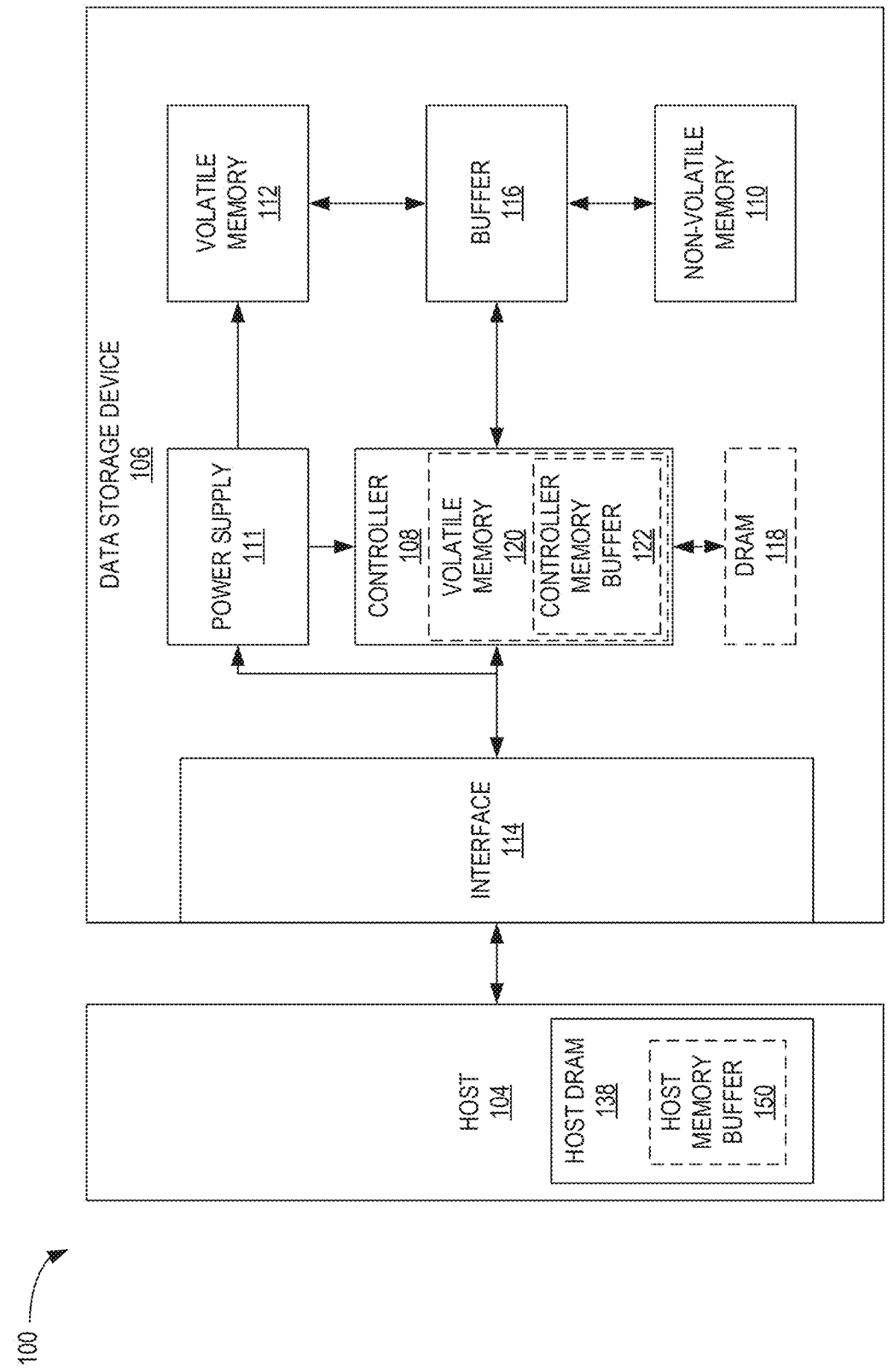
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host dynamic random access memory (DRAM) 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVMe Flash memory devices may include NAND or NOR-based flash memory devices and may store data based on a charge contained in a floating gate of a transistor for each flash memory cell. In NVMe flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVMe cells. Rows of NVMe cells may be electrically connected using a word line to define a page of a plurality of pages. Respective cells in each of the plurality of pages may be electrically connected to respective bit lines. Furthermore, NVMe flash memory devices may be 2D or 3D devices and may be single level cell (SLC), multi-level cell (MLC), triple level cell (TLC), or quad level cell (QLC). The controller 108 may write data to and read data from NVMe flash memory devices at the page level and erase data from NVMe flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), DRAM, SRAM, and synchronous dynamic RAM (SDRAM (e.g., DDR1, DDR2, DDR3, DDR3L, LPDDR3, DDR4, LPDDR4, and the like)). Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

It is to be understood that while reference is made to the host memory buffer (HMB) being used as host volatile memory, the host may also DRAM as volatile memory. Rather, the HMB is an exemplified volatile memory used by a host device. Aspects of the disclosure are equally applicable to DRAM.

Figure 2:
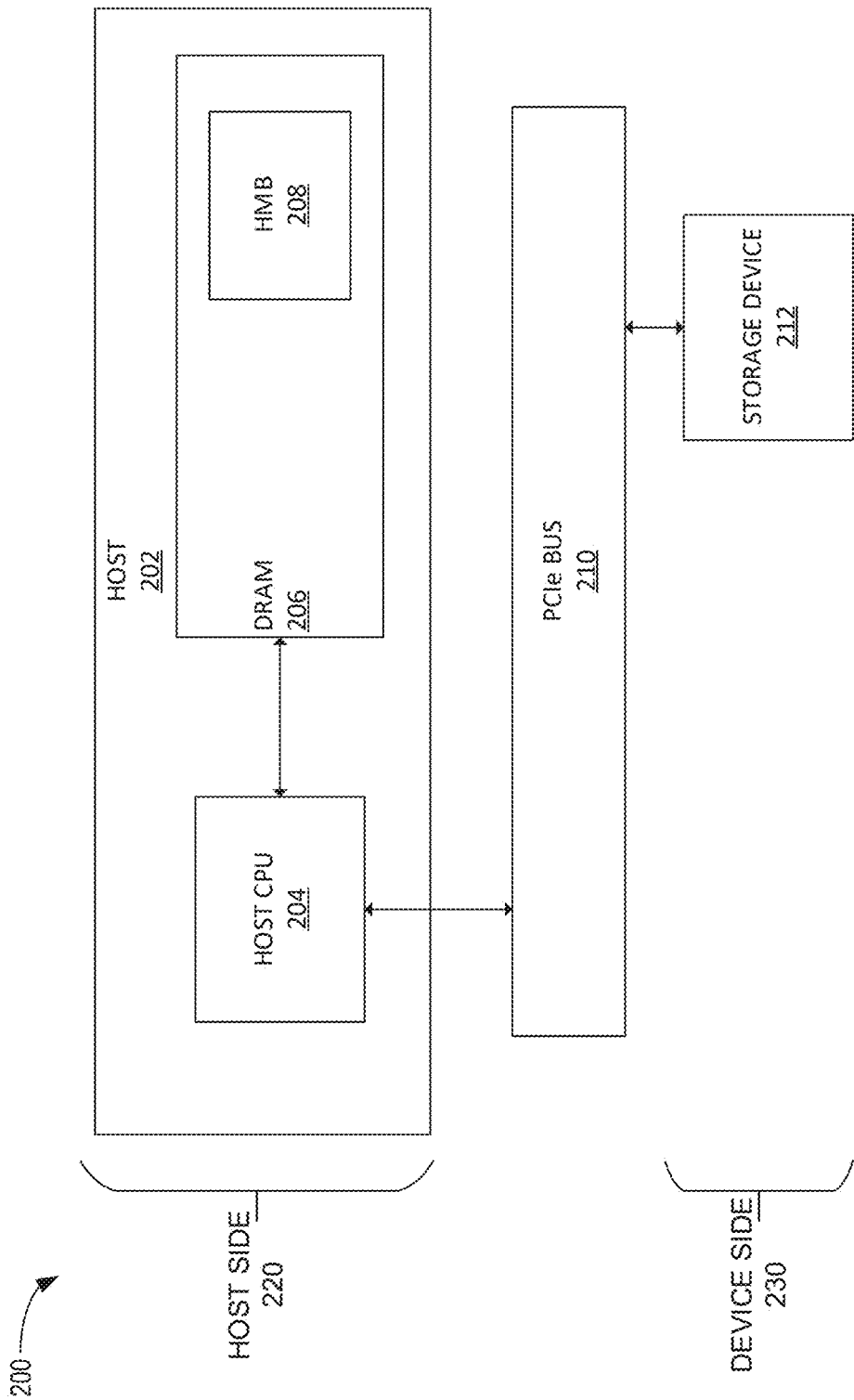
FIG. 2 is a schematic block diagram illustrating a storage system with a HMB, according to one embodiment.

FIG. 2 is a schematic block diagram illustrating a storage system 200 with a HMB, according to one embodiment. Storage system 200 may be further distinguished into a host side 220 and a device side 230. The host side 220 of storage system 200 comprises a host device 202. The host device 202 comprises a host central processing unit (CPU) 204 and DRAM 206. The host CPU 204 and DRAM 206 are communicatively coupled. The host memory buffer (HMB) 208 is part of the host DRAM 206. The device side 230 of storage system 200 comprises a storage device 212. Storage system 200 further comprises a peripheral component interconnect express (PCIe) bus 210. The host CPU and the PCIe bus 210 are communicatively coupled. The PCIe bus 210 and the storage device 212 are communicatively coupled.

The HMB 208 is allocated from the host DRAM 206, as extended SRAM. The HMB 208 may also be assigned to the storage device 212 for internal operations. The HMB 208 is reserved only for the storage device 212 and the host software should not modify the HMB 208 at all. Since HMB 208 is external to storage device 212, the read and write access time between HMB 208 and a device controller of storage device 212, such as controller 108 of FIG. 1, is slower than the read and write access time between a device controller of storage device 212 and internal SRAM of the storage device 212. In other words, for read and write operations, a device controller of storage device 212 can access internal SRAM of storage device 212 faster than external HMB 208. The loading and storing of parities to the HMB is done dynamically during operational mode.

FIG. 3 is a schematic diagram illustrating a flash memory physical block 300, according to another embodiment. Flash memory physical block 300 comprises WLs 302, strings 304, and pages 306. Flash memory cells are connected in a specific order to allow efficient access. A sequence of memory cells are connected in a string 304. A WL 302 is a line that connects all control gates of the memory cells in the same position in the strings 304, and defines a includes one bit from each cell in a WL 302. Programming may be done on all pages, whereas reading is done on parts of a page. In flash memory physical block 300, each WL 302 is connected to five strings 304 (numbered 0, 1, 2, 3, and 4). Strings 304 are repeated in the 0, 1, 2, 3, and 4 order each WL block. Each page 306 is connected to one string 304.

Error correction code (ECC) protection algorithms provide data protection to user and internal data. Storage devices store user and internal data on NAND flash memory dies with redundancy parity data, which is used by ECC protection algorithms. The two main methods of ECC protection are low-density parity-check (LDPC) algorithms and XOR protection. XOR protection is used to protect memory blocks that are together, against physical defects, which can occur in the memory elements of BiCS technology. For example, in BiCS6 memory, physical shorts may occur in WL to WL interactions. To protect WL to WL short problems, any two adjacent WLs 302 in a single plane are protected by unique bins. For BiCS6 memory technology, 10 bins are used for single-level cell (SLC) blocks and 30 bins for triple-level cell (TLC) blocks.

Figure 4:
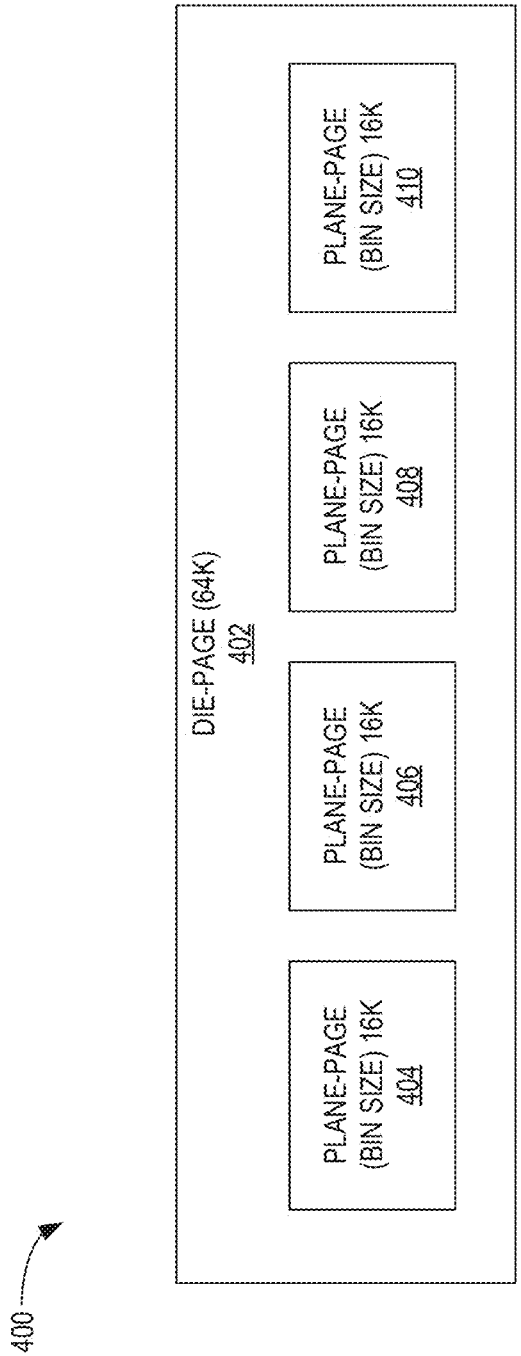
FIG. 4 is a schematic block diagram illustrating a flash memory die page, according to another embodiment.

FIG. 4 is a schematic block diagram illustrating a flash memory die page 400, according to another embodiment. In one embodiment, the flash memory die page 400 is die-page (64 KB) 402. Each bin (16 KB) is a group of die-pages 404, 406, 408, and 410 that are XOR together. A parity bin is determined using Parity Bin=Data1^Data2^ . . . Data3. Each bin parity result is calculated during data accumulation. When the block reaches full capacity the final parity bins' results are stored inside the data block, at the end of the block, or in other parity locations. When the device starts writing to a new block, the parity for the block is set to 0, which is done before writing the data that the parity bins accumulate. Parity accumulation is stored temporarily in the controller SRAM memory. During GSD, the bin parities are stored in a special XOR block of non-volatile memory (e.g. NAND) to all open blocks which are not yet full. During boot and low-power-state exit flows, the parities are loaded from the NAND to the controller SRAM to continue the accumulation process.

Figure 5:
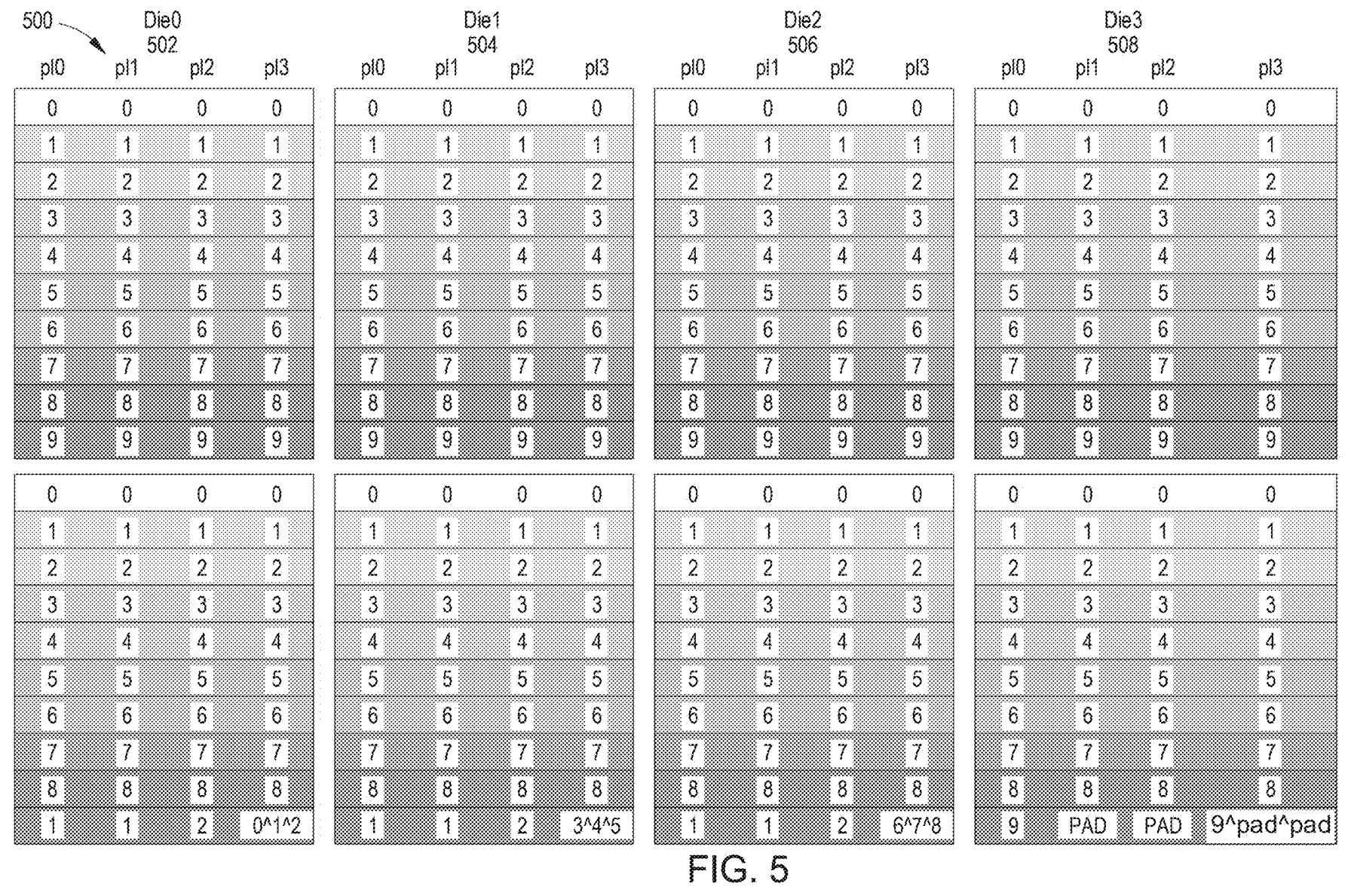

FIG. 5 is a schematic block diagram illustrating a XOR scheme 500 for a single-level cell (SLC) jumbo block, according to another embodiment. XOR scheme 500 for a single-level cell (SLC) jumbo block comprises four die: die0 502, die1 504, die2 506, and die3 508. The parities may be calculated for the jumbo block, which is a logical block composed of several die blocks that improve performance and execute read and write operations in parallel. In a storage device, there are several jumbo blocks which are managed in parallel to store controller and host data. However, the controller SRAM used to store the parities is limited to only a few slots for SLC parity, and a few slots for TLC parity. The rest of the parities are stored in a HMB or a special XOR block, which is used for storing all accumulated parities during a GSD.

FIG. 6 is a schematic block diagram illustrating a jumbo-block that contains XOR data 600 in volatile memory, according to another embodiment. In certain embodiments, the loading and storing of parities to non-volatile memory (e.g. NAND (XOR blocks)) from the HMB will usually happen during graceful shutdown flows or when entering low-power-mode. The SLC jumbo block parity contains 10 bins (160 KB) in the SRAM slot. The TLC jumbo block parity contains 30 bins (480 KB) in the SRAM slot. Since the parity bins are only partially stored in the SRAM, the NAND holds only the next bins that will be used. The controller will continue to copy bins to the HMB and back, where the complete set is saved. The SRAM holds two SLC parities, of 8 bins each holds (128 KB*2), and 2 TLC parities, of 12 bins each holds (192 KB*2). Since the size of SRAM is limited, and the parities are large, only part of the parity bins are held in SRAM. The complete set of parities is stored in HMB. However, the problem is that during the current boot flow and exit from low-power-state or active-idle flow, the parity bins are loaded from NAND to the HMB and then the relevant bins are read from the HMB and written to the SRAM adding significant time to the boot and low-power-state exit flows. By selectively loading only the relevant bins directly into the controller SRAM and the remaining bins into the HMB. This reduces the time needed to ready from the HMB and then write to SRAM.

Exemplary jumbo-block that contains XOR block data 600 comprises multiple dies. For example, DIE0 602, DIE1 604, DIE2 606, and DIE3 608. In the jumbo-block that contains XOR block data 600, 4 different parities are saved from XRAM (i.e., SRAM or DRAM) to the XOR-jumbo-block in NAND. A parity, such as parity 650, has 10 bins which equals the size of 10 planes. However, the firmware may write to 4 planes at a time, so padding (PAD) of 2 planes (e.g. 16 KB*2) is added. Padding may comprise of dummy data or zeros. The first parity 610, second parity 620, third parity 630, and fourth parity 640 are different parities for different open-blocks that were written from the HMB to the NAND. Each parity takes up to 160 KB in the HMB, and takes 196 KB in NAND XOR-jumbo-block.

Figure 7:
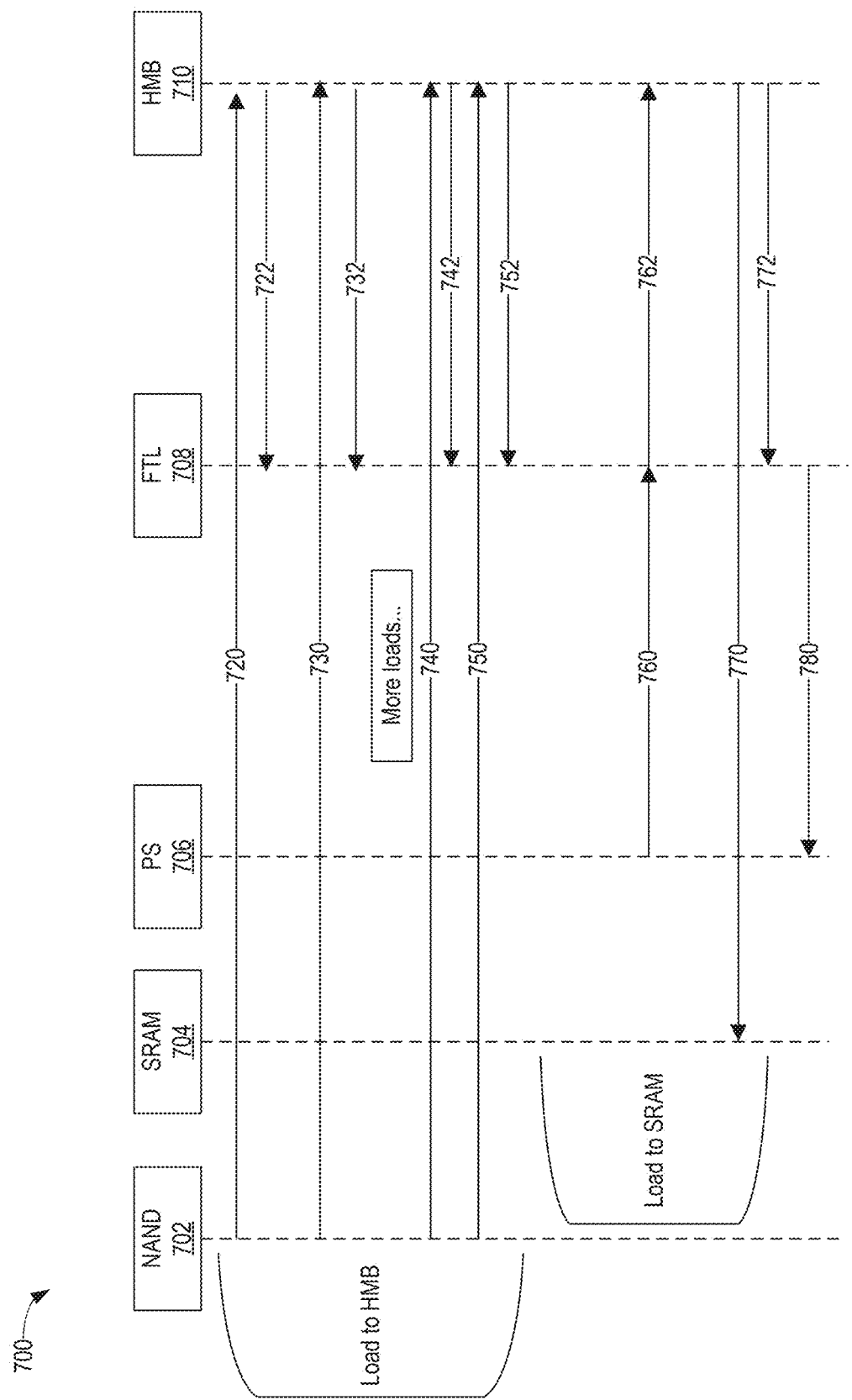
FIG. 7 is a flow diagram illustrating a writing flow of triple-level cell (TLC) parity, according to another embodiment.

FIG. 7 is a flow diagram illustrating a writing flow 700 of a single TLC parity, according to another embodiment. During the writing flow 700 of TLC parity, the controller loads all 10/30 bins from a NAND XOR block to a HMB. The bins are then read from the HMB and written to volatile memory (e.g. SRAM) and the relevant bins, which is of 128 KB/192 KB. Writing flow 700 of TLC parity includes interactions with NAND 702, SRAM 704, physical storage (PS) 706, flash transition layer (FTL) 708, and HMB 710. Load lines 720, 730, 740, and 750 express the loading of the parity bins to HMB 710. If SLC, 10 bins will be loaded, and if TLC, 30 bins will be loaded from the NAND XOR block 702 to the HMB 710. Writing flow 700 depicts the loading of TLC parity, so 30 bins will be loaded from the NAND XOR block 702 to the HMB 710. At load line 720 (Index0), 4 bins are loaded to HMB 710. At load line 730 (Index4), an additional 4 bins are loaded to the HMB 710. The controller continues to load bins from the NAND XOR block 702 to the HMB 710 in increments, denoted by "more loads." At load line 740 (Index24), another 4 bins are loaded to the HMB 710. At load line 750 (Index 28), the last 2 bins are loaded to the HMB 710. After load line 750, 30 bins are stored in the HMB 710.

Every time bins are loaded into the HMB 710, the HMB 710 will acknowledge the load completion by sending an acknowledgement of load completion 722, 732, 742, 752 to the FTL 708. After loading the bins to the HMB 710 (i.e., after load line 750), the controller then copies specific bins from a start bin. PS 706 sends a request to FTL 708 (at load line 760) that is then sent to the HMB 710 (at load line 762) to copy 12 specific bins from the start bin. The PS 706 calculates the value of the start bin, which is calculated according to the host-block location next-to-write address. At read line 770, the controller copies the 12 specific bins to the SRAM 704. After read line 770, both the HMB 710 and the FTL 708 send read acknowledgements 772, 780 that the 12 specific bins were read. Writing flow 700 is executed four times in total: twice for SLC open blocks, and twice for TLC open blocks.

Figure 8:
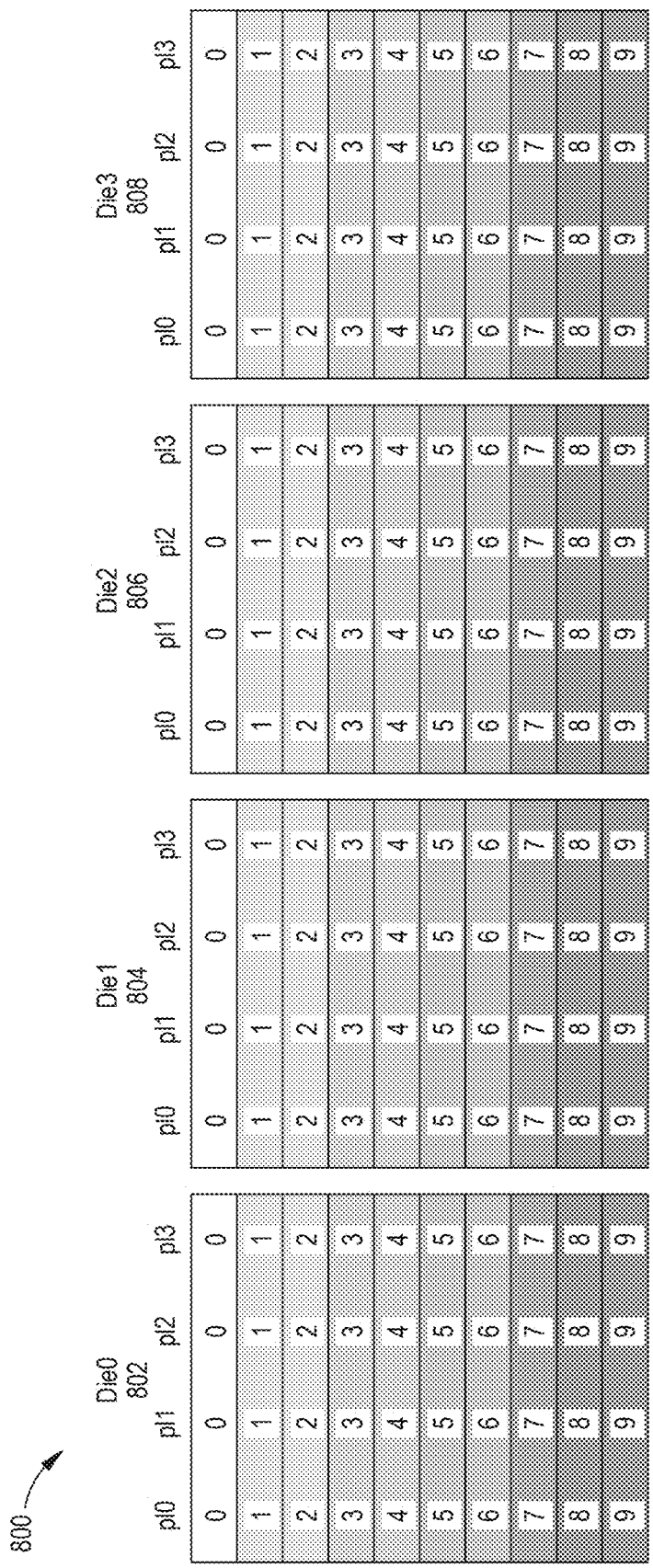
FIG. 8 is a schematic diagram illustrating a XOR scheme for jumbo block, according to another embodiment.

FIG. 8 is a schematic diagram illustrating a XOR scheme 800 for jumbo block, according to another embodiment. On boot and low-power-state exit flows, the controller needs to load the bin parities from the NAND to the SRAM so that the controller can continue updating the XOR parities. The controller is configured to load the relevant bins directly to SRAM. XOR scheme 800 comprises of four dies: die0 802, die1 804, die2 806, and die3 808. XOR scheme 800 depicts that a specific logical WL is associated with a specific bin, and that each row represents a different bin.

The controller stores the state of an open host and the address where the next data should be written (i.e., the "next-to-write" address). The next-to-write address is what determines which parity bin is "relevant." Relevant parity bins are the next bins that will be written. For example, for a TLC block, if the next address to write to is in line 4, the controller will load the 12 following bins directly to SRAM 4, 5, 6, 7 and 8, 9, 10, 11 and 12, 13, 14, 15. If the next address to write to is in line 24, the controller will load bins numbers 24, 25, 26, 27 and 28, 29, 0, 1, and 2, 3, 4, 5 to the SRAM. The bins that are not loaded to SRAM are written to HMB. Therefore, there is no additional read from HMB and write to SRAM needed for the bins written directly to SRAM.

Figure 9:
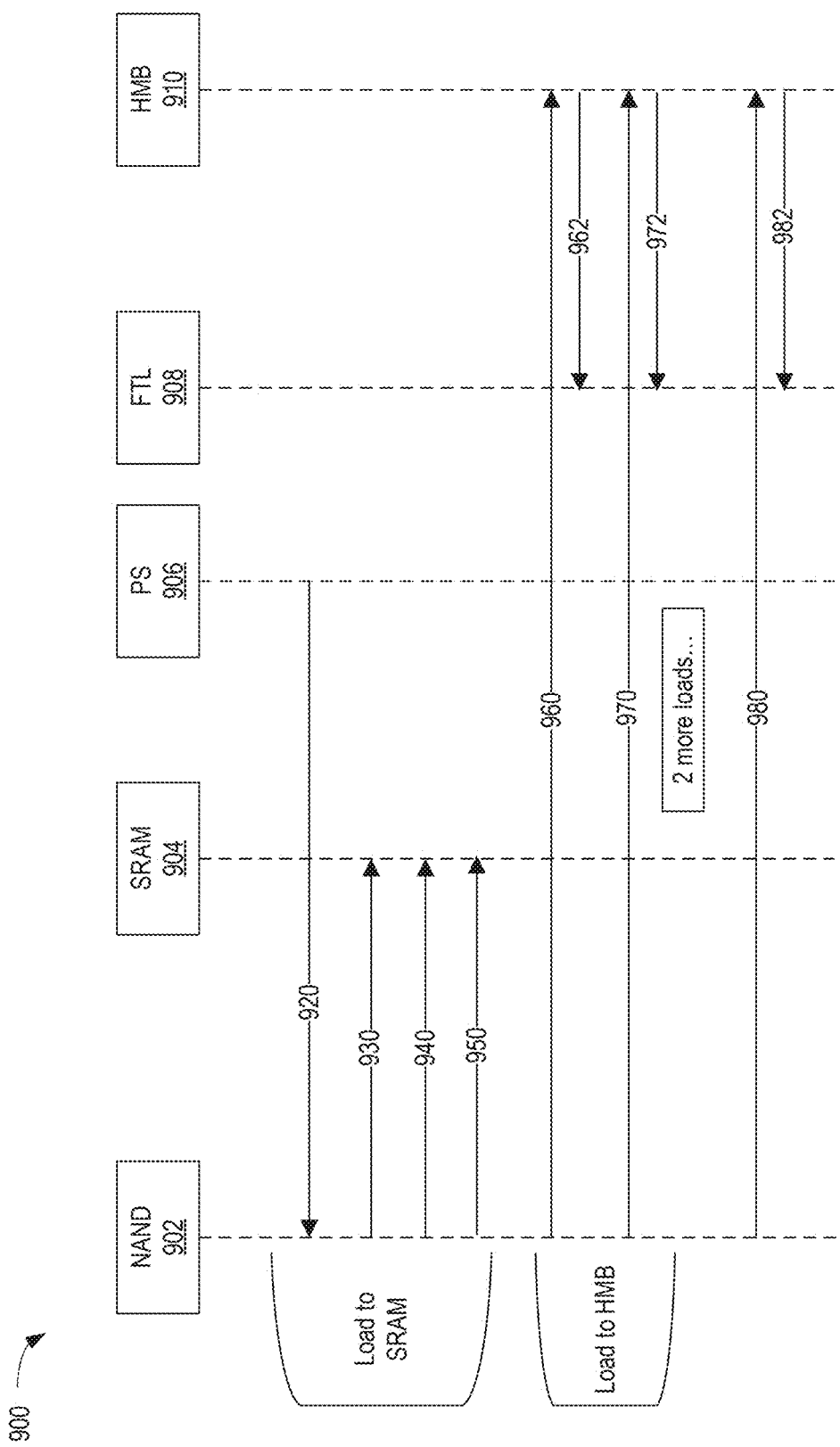
FIG. 9 is a flow diagram illustrating a writing flow of triple-level cell (TLC) parity, according to another embodiment.

FIG. 9 is a flow diagram illustrating a writing flow 900 of triple-level cell (TLC) parity, according to another embodiment. Writing flow 900 includes interactions with the NAND 902, SRAM 904, PS 906, FTL 908, and HMB 910. At copy line 920, the controller copies 12 specific bins (i.e., the relevant bins) from a start bin in PS 906 to NAND 902, based on the next-to-write host-block location. At load lines 930, 940, and 950, the controller will load the 12 specific bins to SRAM 904, each load line will load 4 bins to SRAM 904. After loading the 12 specific bins to SRAM 904, the controller will start to load the remaining (i.e., non-specific and not relevant) bins to HMB 910. At load line 960 (Index12), the controller will load 4 non-specific bins to the HMB 910. The index number (e.g., Index12) indicates the place in a memory buffer in the HMB. At load lines 970 (Index16) and 980 (Index28), 4 bins will be loaded to the HMB 910 for each load line 970, 980. Two additional loads occur between load lines 970 and 980, loading 4 additional bins each, denoted by "2 more loads . . . " I.e., 4 bins are loaded to the HMB (Index20), and an additional 4 bins are loaded to the HMB (Index24). After load line 980, the remaining 18 non-specific bins have been loaded to the HMB 910. When bins are uploaded to the HMB 910, the HMB 910 will acknowledge load completion by sending acknowledgement of load completion 962, 972, and 982 to the FTL 908. Since the relevant bins are loaded to SRAM 904, and the remaining bins are loaded to the HMB 910, no additional reads from the HMB 910 and writes to SRAM 904 are needed. As a result, exit latency from the boot and low-power-state exit flows is improved.

Figure 10:
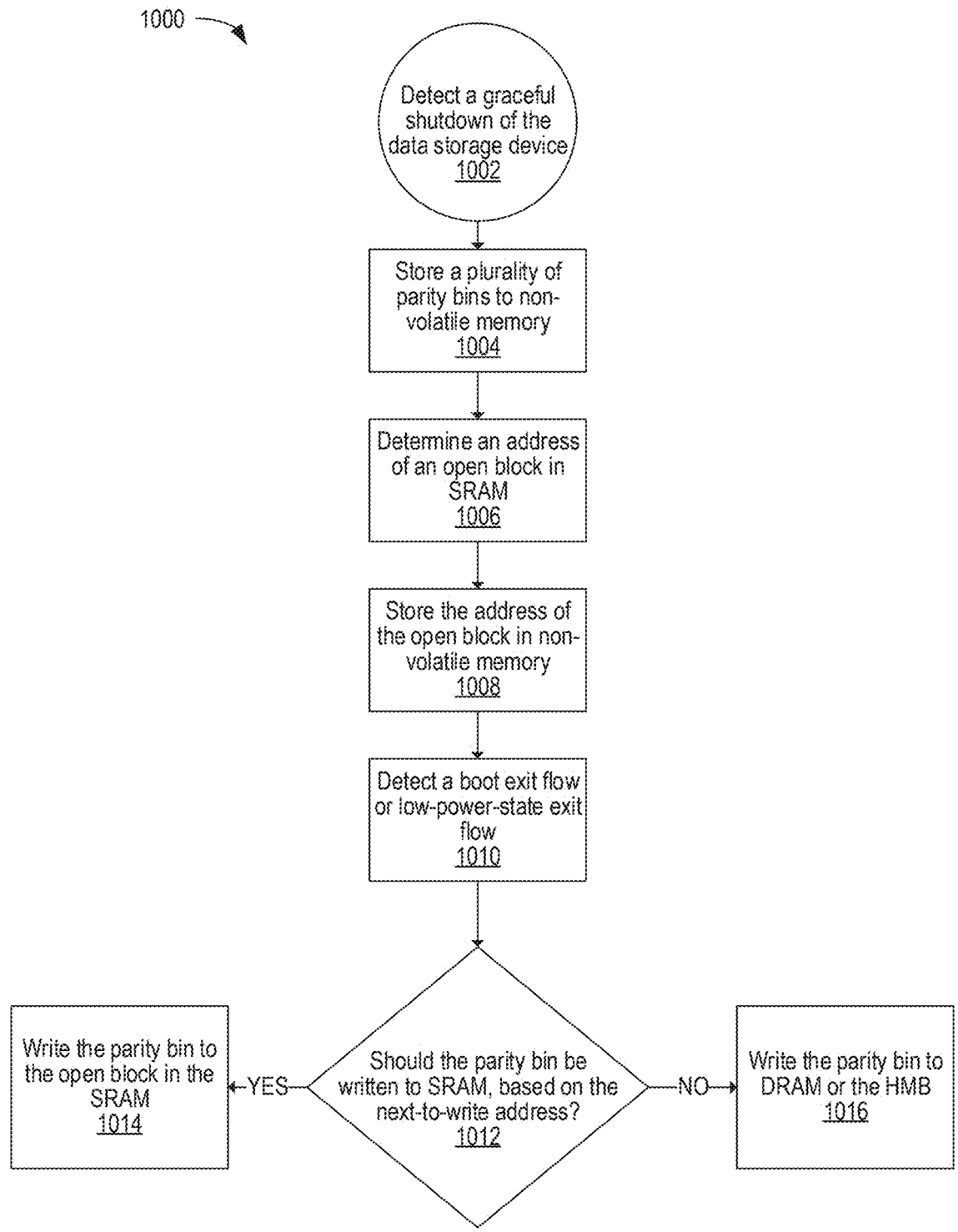
FIG. 10 is a flowchart illustrating a parity bin storage process, according to another embodiment.

FIG. 10 is a flowchart illustrating a parity bin storage process 1000, according to another embodiment. Parity bin storage process 1000 reads parity bins from NAND and stores the relevant parity bins (i.e., parity bins that will be written next) to SRAM. Only the minimal amount of relevant XOR parities in stored in the SRAM during boot and low-power-state exit flows. The remaining XOR parities are stored in the HMB, thus reducing the number of read and write operations from the HMB back to storage device's internal SRAM. In these time sensitive flows, microseconds can be saved during boot and low-power-state exit flows, while complexity of additional messages on the bus is saved (an amount of data that is not read). Thus, parity bin storage reduces the time needed to read from the HMB and write into the relevant bins in volatile memory (e.g. SRAM). In certain embodiments, the saved data size may be 640 KB since SLC parity (128 KB) times the number of open SLC jumbo blocks (2) plus TLC parity (192 KB) times the number of open TLC jumbo blocks (2) equals 128 KB*2+ 192 KB*2 equals 640 KB.

At block 1002, the controller detects a graceful shutdown of the data storage device. At block 1004, the controller stores a plurality of parity bins to non-volatile memory (i.e., NAND). At block 1006, the controller determines an address of an open block in SRAM. At block 1008, the controller stores the address of the open block in non-volatile memory. At block 1010, the controller detects a boot or low-power-state exit flow. At block 1012, the controller determines whether the parity bin should be written to SRAM based on the next-to-write address. If the parity bin should be written to SRAM, then at block 1014, the controller will write the parity bin to the open block in SRAM. If the parity bin should not be written to SRAM, then at block 1016, the controller will write the parity bin to DRAM or the HMB.

Selectively writing relevant bins directly to a controller's volatile memory (e.g., SRAM) based on a next-to-write address and writing the remaining bins to a host's volatile memory (e.g., DRAM or HMB), avoids the need for any additional reads from host's volatile memory and writes from controller's volatile memory. Avoiding the need for any additional reads from host's volatile memory, which has a slower access time than controller's volatile memory, improves exit latency from the boot and low-power-state exit flows. Prior to writing the parity bins to the controller or the host, the controller may store parity bins and/or the next-to-write address in non-volatile memory. The next-to-write address is then evaluated to determine whether a party bin is written to the controller's volatile memory or the host's volatile memory.

In one embodiment, a data storage device comprises: a memory device; and a controller coupled to the memory device, wherein the controller is configured to: store a plurality of parity bins in non-volatile memory; select at least one parity bin from the plurality of parity bins to write to a first volatile memory; write the at least one parity bin to the first volatile memory; and write the remaining parity bins of the plurality of parity bins to a second volatile memory. The non-volatile memory is NAND. The first volatile memory is static random access memory (SRAM). The second volatile memory is dynamic random access memory (DRAM) or a host memory buffer (HMB). A selection of the at least one parity bin is based on the next data to be written to the first volatile memory. The controller is further configured to store the plurality of parity bins to non-volatile memory during a graceful shutdown flow. The controller is further configured to write the at least one parity bin to the first volatile memory during a boot exit flow. The controller is further configured to write the at least one parity bin to the first volatile memory during a low-power-state exit flow. The controller is further configured to receive acknowledgement from the second volatile memory after writing the remaining parity bins of the plurality of parity bins to the second volatile memory. The controller does not receive acknowledgement from the first volatile memory after writing the at least one parity bin to the first volatile memory. The controller is further configured to: determine an address of an open block in the first volatile memory, wherein the address of the open block in the first volatile memory is a next address in the first volatile memory where a next data will be written; store the address of the open block in non-volatile memory; write at least one first parity bin to the open block in the first volatile memory; and write at least one second parity bin to the second volatile memory. The controller is further configured to: store the plurality of parity bins in non-volatile memory in response to a pre-determined event; determine an address of an open block in the first volatile memory, wherein the address of the open block in the first volatile memory is a next address in the first volatile memory where a next data will be written; store the address of the open block in the first volatile memory; and select at least one parity bin from the plurality of parity bins to write to the first volatile memory during a boot exit flow or a low-power-state exit flow.

In another embodiment, a data storage device comprise: a memory device; and a controller coupled to the memory device, wherein the controller is configured to: determine an address of an open block in a first volatile memory, wherein the address of the open block in the first volatile memory is a next address in the first volatile memory where a next data will be written; store the address of the open block in non-volatile memory; select at least one first parity bin to write to the first volatile memory; write the at least one first parity bin to the open block in the first volatile memory; and write at least one second parity bin to a second volatile memory. The controller is further configured to select the at least one first parity bin based on the next data to be written to the first volatile memory. The at least one first parity bin is triple-level cell (TLC) parity. The at least one first parity bin is single-level cell (SLC) parity. The controller is further configured to store the at least one first and second parity bins in non-volatile memory prior to writing the at least one first and second parity bins to volatile memory.

In another embodiment, a data storage device comprises: means to store data; and a controller coupled to the means to store data, wherein the controller is configured to: store a plurality of parity bins in non-volatile memory in response to a pre-determined event; determine an address of an open block in a first volatile memory, wherein the address of the open block in the first volatile memory is a next address in the first volatile memory where a next data will be written; store the address of the open block in the first volatile memory; select at least one parity bin from the plurality of parity bins to write to a first volatile memory during a boot exit flow or a low-power-state exit flow; write the at least one parity bin to the first volatile memory; and write the remaining parity bins of the plurality of parity bins to a second volatile memory. The pre-determined event is a graceful shutdown of the data storage device. The controller is further configured to write the at least one parity bin to the open block in the first volatile memory.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
    a memory device; and
    a controller coupled to the memory device, wherein the controller is configured to:
        store a plurality of parity bins in non-volatile memory;
        determine a next address of a first volatile memory where data should be written;
        select at least one parity bin from the plurality of parity bins to write to the first volatile memory, wherein the selecting is based on whether the at least one parity bin is relevant, wherein a parity bin is relevant if the parity bin is associated with the next address of the first volatile memory where data should be written;
        write at least one relevant parity bin of the plurality of parity bins to the first volatile memory; and
        write non-relevant parity bins of the plurality of parity bins to a second volatile memory.

2. The data storage device of claim 1, wherein the non-volatile memory is NAND.

3. The data storage device of claim 1, wherein the first volatile memory is static random access memory (SRAM).

4. The data storage device of claim 1, wherein the second volatile memory is dynamic random access memory (DRAM) or a host memory buffer (HMB).

5. The data storage device of claim 1, wherein the controller is further configured to store the plurality of parity bins to non-volatile memory during a graceful shutdown flow.

6. The data storage device of claim 1, wherein writing the at least one relevant parity bin to the first volatile memory occurs during a boot exit flow.

7. The data storage device of claim 1, wherein writing the at least one relevant parity bin to the first volatile memory occurs during a low-power-state exit flow.

8. The data storage device of claim 1, wherein the controller is further configured to receive acknowledgement from the second volatile memory after writing non-relevant parity bins of the plurality of parity bins to the second volatile memory.

9. The data storage device of claim 1, wherein the controller does not receive acknowledgement from the first volatile memory after writing the at least relevant one parity bin to the first volatile memory.

10. The data storage device of claim 1, wherein the controller is further configured to:
    determine an address of an open block in the first volatile memory, wherein the address of the open block in the first volatile memory is a next address in the first volatile memory where a next data will be written;
    store the address of the open block in non-volatile memory;
    write at least one first parity bin to the open block in the first volatile memory; and
    write at least one second parity bin to the second volatile memory.

11. The data storage device of claim 1, wherein the controller is further configured to:
    store the plurality of parity bins in non-volatile memory in response to a pre-determined event;
    determine an address of an open block in the first volatile memory, wherein the address of the open block in the first volatile memory is a next address in the first volatile memory where a next data will be written;

store the address of the open block in the first volatile memory; and select at least one parity bin from the plurality of parity bins to write to the first volatile memory during a boot exit flow or a low-power-state exit flow.

12. The data storage device of claim 1, wherein each parity bin of the plurality of parity bins is associated with a different address of the first volatile memory.

13. The data storage device of claim 1, wherein the first volatile memory has a faster access time than the second volatile memory.

14. A data storage device, comprising:
a memory device; and
a controller coupled to the memory device, wherein the controller is configured to:
determine an address of an open block in a first volatile memory, wherein the address of the open block in the first volatile memory is a next address in the first volatile memory where a next data will be written;
store the address of the open block in non-volatile memory;
select at least one parity bin from a plurality of parity bins to write to the first volatile memory, wherein the selecting is based on whether the at least one parity bin is relevant, wherein a parity bin is relevant if the parity bin is associated with the next address;
write at least one relevant parity bin of the plurality of parity bins to the open block in the first volatile memory; and
write at least one non-relevant parity bin of the plurality of parity bins to a second volatile memory.

15. The data storage device of claim 14, wherein the at least one relevant parity bin is triple-level cell (TLC) parity.

16. The data storage device of claim 14, wherein the at least one relevant parity bin is single-level cell (SLC) parity.

17. The data storage device of claim 14, wherein the controller is further configured to store the plurality of parity bins in non-volatile memory prior to writing the at least one relevant and non-relevant parity bins to volatile memory.

18. A data storage device, comprising:
means to store data; and
a controller coupled to the means to store data, wherein the controller is configured to:
store a plurality of parity bins in non-volatile memory in response to a pre-determined event;
determine an address of an open block in a first volatile memory, wherein the address of the open block in the first volatile memory is a next address in the first volatile memory where a next data will be written;
store the address of the open block in the first volatile memory;
select at least one parity bin from the plurality of parity bins to write to a first volatile memory during a boot exit flow or a low-power-state exit flow, wherein the selecting is based on whether the at least one parity bin is relevant, wherein a parity bin is relevant if the parity bin is associated with the next address of the first volatile memory where data should be written;
write at least one relevant parity bin of the plurality of parity bins to the first volatile memory; and
write non-relevant parity bins of the plurality of parity bins to a second volatile memory.

19. The data storage device of claim 18, wherein the pre-determined event is a graceful shutdown of the data storage device.

20. The data storage device of claim 18, wherein the controller is further configured to write the at least one parity bin to the open block in the first volatile memory.

* * * * *